(12) United States Patent
Shakib et al.

(10) Patent No.: US 7,792,821 B2
(45) Date of Patent: Sep. 7, 2010

(54) PRESENTATION OF STRUCTURED SEARCH RESULTS

(75) Inventors: Darren A. Shakib, North Bend, WA (US); Gary William Flake, Bellevue, WA (US); Ramez Naam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 11/427,693

(22) Filed: Jun. 29, 2006

(65) Prior Publication Data

US 2008/0005118 A1 Jan. 3, 2008

(51) Int. Cl.
*G06F 17/30* (2006.01)
(52) U.S. Cl. .............. 707/714; 707/749; 707/999.005
(58) Field of Classification Search .............. 707/1–6, 707/10, 100, 101, 714, 749, 999.003–999.006, 707/999.01
See application file for complete search history.

(56) References Cited

U.S. PATENT DOCUMENTS

| 6,282,537 | B1 | 8/2001 | Madnick | |
|---|---|---|---|---|
| 6,584,464 | B1 | 6/2003 | Warthen | |
| 6,691,108 | B2 | 2/2004 | Li | |
| 6,725,425 | B1 | 4/2004 | Rajan | |
| 6,847,960 | B1 | 1/2005 | Li | |
| 6,968,331 | B2 | 11/2005 | Bar-Yossef | |
| 6,980,984 | B1 | 12/2005 | Huffman | |
| 7,194,457 | B1 * | 3/2007 | Alavi et al. ........................ | 1/1 |
| 2003/0144892 | A1 | 7/2003 | Cowan | |
| 2005/0027687 | A1 | 2/2005 | Nowitz | |
| 2005/0251513 | A1 | 11/2005 | Tenazas | |
| 2006/0004725 | A1 | 1/2006 | Abraido-Fandino | |
| 2007/0168331 | A1 * | 7/2007 | Reddy et al. .................... | 707/3 |
| 2007/0250499 | A1 * | 10/2007 | Widdowson et al. ........... | 707/5 |
| 2008/0016050 | A1 * | 1/2008 | Stensmo ........................ | 707/4 |

FOREIGN PATENT DOCUMENTS

| WO | WO03042873 | 5/2003 |
|---|---|---|
| WO | WO2005111863 | 11/2005 |

OTHER PUBLICATIONS

David A Grossman, IIT Intranet Mediator: Bringing Data Together on a Corporate Intranet, IT Pro, Jan./Feb. 2002.
Christopher Kunz, Visual Representative and Contextualization of Search Results—List and Matrix Browser, Proc. Int. Conf. on Dublin Core and Metadata for e-Communities 2002, pp. 229-234, Firenze University Press.
Automatic Presentation of Structured Search UI in Response to Unstructured Queries, Feb. 16, 2006.

\* cited by examiner

*Primary Examiner*—Marc R Filipczyk
(74) *Attorney, Agent, or Firm*—Shook, Hardy & Bacon L.L.P.

(57) ABSTRACT

A method and system is provided for automatically displaying a search-refinement user interface based on structure identified in search results in response to unstructured search queries. A list of search results obtained by a search engine is analyzed to determined whether a structure threshold is satisfied. If the threshold is met, then search-refinement options are displayed on a common display with the search results to allow the user to filter the search results according to the structure identified in the results. The user interface can receive filter and sort requests from the user to further refine the search results based on overlapping schema attributes or other shared-structure elements identified in the search results.

15 Claims, 5 Drawing Sheets

PRESENTATION OF STRUCTURED SEARCH RESULTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The internet has become an increasingly important information source for computer users today. As the amount of information accessible via the internet continues to grow rapidly, the importance of search-engine technology continues to increase. Users demand and expect relevant, accurate search results in response to general search queries entered into web-based search engines. A multitude of search engine algorithms exist for indexing and searching the vast array of content available on the web. But, current search engine interfaces do not take advantage of much of the structure that is often present in web content today.

Many web pages contain some type of structure, as opposed to consisting of just ad hoc unstructured text. For example, many web pages contain similar fields for attributes such as product prices, titles, publication dates, author names, etc. Some web pages are structured based on formal schemas that have specified attributes. In some cases, web pages may even reference particular formal schemas. Other web pages, though not adhering to a formal schema, share common attributes because they are geared towards a common purpose. For example, web pages that exist for the purpose of selling products will often have a product name attribute and a price attribute for each product listed. Web pages published for the purpose of selling automobiles might also include the attributes of year, model, color, and mileage.

If search engines tapped into existing structural elements in web pages, an additional dimension of information could be provided about a list of search results. Further, a list of search results could be refined and narrowed by displaying common attributes located by the search engine and allowing the user to filter the search results based on different values associated with each attribute for each search result. For example, if a search engine identified price as a common attribute amongst relevant search results, a price-range filter could be displayed to the user to allow him or her to filter the results based on various price ranges inherent in the search results. Likewise, any structured information present in web pages could be used to provide the user with similar search-refinement options.

Currently, certain specialized search engines are available, such as those for searching shopping content or news content, but these search engines require a user to initially decide to limit their search to a particular type of content. And, often, these search engines have web pages specifically published to them in a particular format to facilitate structured searches. But, most user searches performed today continue to be unstructured queries. As such, a way of responding to unstructured search queries by automatically providing search-refinement options based on structure present in a set of search results is needed.

BRIEF SUMMARY

In an embodiment, a method for automatically displaying web-search results on a common display with search-refinement options based on structure identified in the web-search results is provided. Search results obtained for a web-search query are analyzed to determine whether sufficient shared-structure elements are present in the search results to satisfy a structure threshold. If the threshold is satisfied, then search-refinement options are presented to a user based on the structure identified in the search results.

In another embodiment, a system for automatically providing a structured-search-results user interface in response to unstructured search queries is provided. The system comprises a data store, a search engine component, and an interface component. The search engine component is operative to obtain search results from the data store and analyze the search results to identify overlapping schema attributes present in the results and determine whether a structure threshold is satisfied. The interface component is operative to display the search results on a common display with search-refining options based on the identified overlapping schema attributes.

In another embodiment, a method for automatically providing search-refinement options in response to a user's unstructured search query using a "two-pass" analysis of search results is provided. A list of search results ranked in order of relevance is obtained for an unstructured search query. A set of highly-relevant results is analyzed to determine whether a common structure attribute is present. If so, the list of search results is analyzed using the common structure attribute to generate a search filter. The search results are then displayed in a structure-search results interface suggesting the search filter to the user. In another embodiment, the search results are refined according to the suggested search filter in response to a user request to refine the search results based on the identified common structure attribute.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Embodiments of the present invention are described in detail below with reference to the attached drawing figures, which are incorporated by reference herein and wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention provide methods, systems, and computer-readable media for automatically displaying a structured-search-results user interface in response to unstructured search queries. Exemplary embodiments will be discussed first, followed by a discussion of an exemplary operating environment with reference to FIG. 1.

Figure 2:
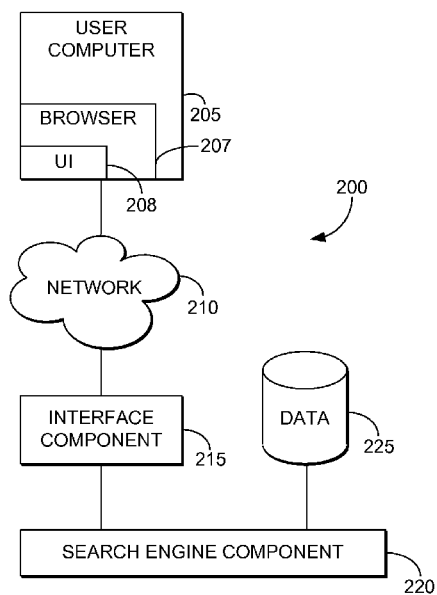
FIG. 2 is a block diagram of an exemplary system in accordance with embodiments of the present invention.

FIG. 2 provides an exemplary system 200 for automatically providing a structured-search-results user interface in response to unstructured search queries. The system 200 includes a user computer 205, such as the computing device 100 described above. The user computer 205 has a browser 207 accessible through a user interface (UI) 208. The user computer 205 is coupled to an interface component 215 via a network 210. The network 210 can be any network, such as the internet. The interface component 215 can be configured to receive any number of user inputs including web-search queries. The search queries may be entered as text, and the interface component may provide user-selectable options related to the desired content. That is, the interface component may provide a user interface with or without search verticals. For example, an interface may be provided allowing the user to specify a subject category for the search, such as shopping or news. Or, the interface may be designed to receive general, unstructured queries. As various search queries are entered, the interface component 215 can communicate these inputs to the search engine component 220. The search engine component 220 is coupled to a data store 225.

The data store 225 can store any type of information. This information may include web content, web-search results, images, news, facts, and other types of information commonly found on the web, for example. The data store 225 may also include advertising content. The search engine component 220 is operative to traverse the data store 225 to obtain search results in response to search queries. The search engine component 220 is capable of determining which search results are most relevant to particular search queries. Those skilled in the art will recognize that various search utilities exist in the art and that any of these known search techniques may be used. For example, the search engine component 220 may use search terms contained in the search query to identify matching terms contained in potential search results stored in data store 225. And, as potential results are considered, the search engine component 220 may use a relevancy-ranking heuristic to determine which potential results should be selected. Again, such search techniques and relevancy-ranking heuristics are well known in the art, and the present invention is not limited to any particular search algorithm.

The search engine component 220 is further operative to analyze search results to determine whether a structure threshold is satisfied. For example, in embodiments of the present invention, the search engine component determines whether search results have schemas with attributes that overlap sufficiently to meet a structure threshold. If common fields appear in the search results with a sufficiently high frequency, the search engine component 220 will determine that a structure threshold has been satisfied. The threshold can be based on a minimum absolute count of results or on a minimum percentage of the results. In an embodiment, the search engine component 220 is operative to perform a "second-pass" analysis to extract common attributes from the search results. These common attributes can be offered to the user as search-refinement options to allow the user to further narrow search results. For example, the search engine component 220 may identify a common attribute of "price" in the search results. In an embodiment, the search engine component 220 instructs the interface component 215 to display price as a search-refinement option to the user after having identified price as a common attribute in the search results. In doing so, the search engine component 220 takes advantage of structure present in the search results to offer search-refinement options to the user. Various methods of indexing and searching structured data present in potential web-search results are known in the art. For example, the search engine component 220 may use meta-tags, such as search tags, to identify potential structure present in the search results. The meta-tags may contain name-value pairs that can be used by the search engine component 220 to determine whether the structure threshold is satisfied. The search engine component 220 may also search attributes contained in pages coded using an XML schema. These pages might be coded using any type of XML schema, such as Document Type Definition (DTD) or XML Schema. If a sufficient number of the search results have similar name-value pairs sharing common field names such as name, price, or category then the search engine component 220 may determine that the structure threshold is satisfied. This process will be described in further detail below with reference to FIGS. 3 and 4.

In another embodiment, the search engine component 220 analyzes the structure identified in the search results to determine whether a variance threshold has been satisfied. For example, if language is identified as a common attribute across the search results sufficient to satisfy the structure threshold, then language can be offered as a search-refinement option. But, if the search results all have the same attribute of being in the English language, then this attribute is not a useful search-refinement option. By employing a variance threshold, search engine component 220 can determine whether particular identified, shared attributes vary sufficiently across the search results to satisfy a variance threshold. In this embodiment, if the variance threshold is satisfied for a particular attribute, then the attribute is used to offer a search-refinement option to the user.

Figure 3:
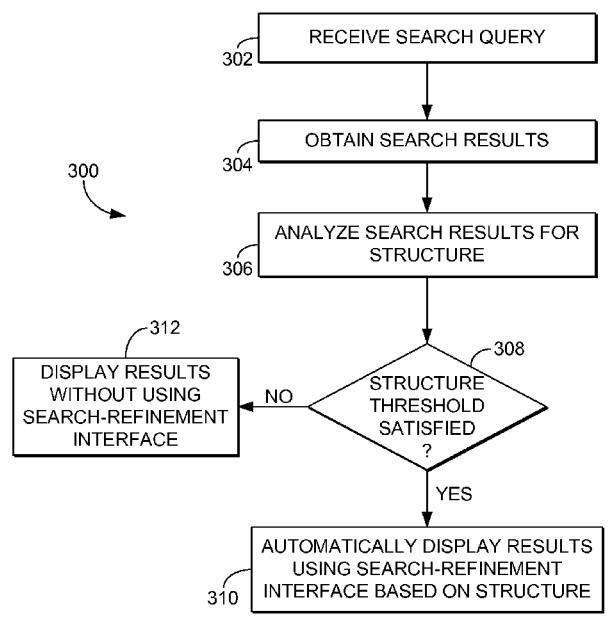
FIG. 3 is a flow diagram illustrating a method for automatically providing a search-refinement interface based on structure identified in search results, according to embodiments of the present invention.

FIG. 3 provides an exemplary method 300 for displaying search results, such as web-search results, automatically with search-refinement options on a common display in response to unstructured web-search queries. At a step 302, a search query is received. The search query may be any type of search query and may be unstructured or structured. That is, the web query may be entered with the assistance of a search vertical user interface or may be a general, unstructured web query.

At a step 304, search results are obtained based on the search query. This may be performed, for example, by the search engine component 220 performing any type of search algorithm to traverse the data stored in data store 225. Methods of obtaining search results using a search engine are well known in the art, and the present invention is not limited to any particular search technique. After a list of search results is obtained that have been deemed relevant to the search query, at a step 306 the search results are analyzed to identify any shared-structure elements present in the search results. Again, any method for identifying structure present in search results may be used. These shared-structure elements can be, for example, similar name-value pairs contained in meta-tags or XML code, overlapping schema attributes, or any other shared-structure elements. These shared-structure elements could also be a common field name such as price, product name, category, rating, author, or any other field name.

At a step 308, the identified shared-structure elements are used to determine whether sufficient shared-structure elements are present in the search results to satisfy a structure threshold. The structure threshold designates a minimum amount of structure that must be present in the search results to justify displaying search-refinement options to the user based on the identified shared-structure elements. The structure threshold can be an absolute minimum number of search results that must have one or more shared-structure elements or it can be a minimum percentage or proportion of the total search results that must have the shared-structure elements in order to warrant display of the search-refinement options. This step ensures that the structured-search-results interface will not be displayed if there is not a sufficient amount of relevant structure present in the search results. For example, if a user enters a search query of "Nissan Altima," the search results obtained for "Nissan Altima" will be analyzed to identify any shared-structure elements present. The elements of price, year, and mileage may be identified as shared structure elements. The method 300 will then determine whether sufficient search results contain these shared-structure elements. For example, the method 300 may determine that 75% of the thirty most-relevant search results contain the shared-structure elements of price, year, and mileage. If the structure threshold requires that a minimum of 50% of the thirty-most relevant results contain the shared-structure elements, then the structure threshold is satisfied in this case.

At a step 310, if the structure threshold is satisfied, a structured search results interface is automatically displayed. In an embodiment, the structured search results user interface displays search-refinement options based on the identified structure on a common display with the search results. In another embodiment, search-refinement options are offered after identifying relevant structure and also determining whether the search results exhibit sufficient variety with regard to particular identified structural attributes. For example, if all of the search results are for "Nissan Altima," then a variance threshold can be employed to determine that the results do not vary sufficiently to offer the car model attribute as a search-refinement option. Exemplary user interfaces will be described below. If the structure threshold is not satisfied, then at a step 312 the search results are displayed in an unstructured-search-results user interface that does not offer search refinement options based on structure. Most search-results user interfaces today are unstructured interfaces. A method for displaying refined search results on a structured search results interface will be discussed below with reference to FIG. 5.

Figure 4:
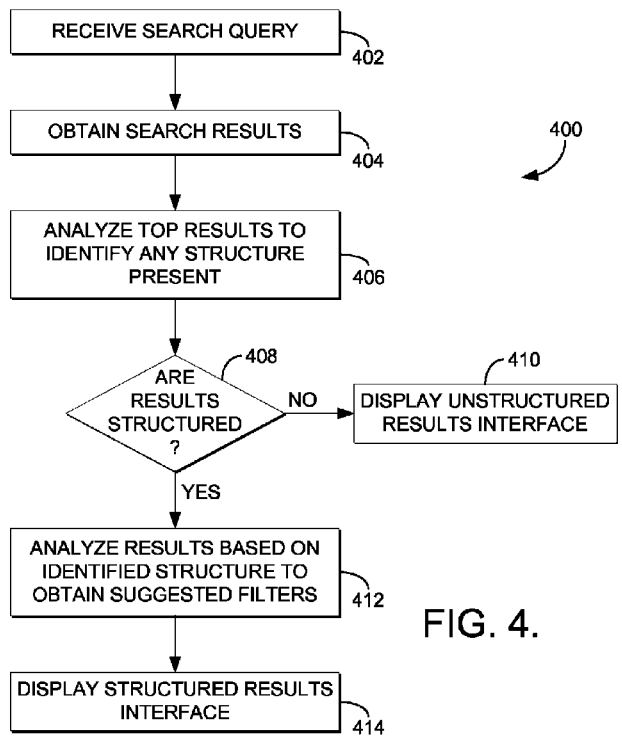
FIG. 4 is a flow diagram illustrating a method for performing a two-pass analysis of search results in order to automatically display suggested search filters based on structure identified in the search results, according to embodiments of the present invention.

FIG. 4 provides an exemplary method 400 for automatically displaying a structured-search-results interface using a "two-pass" analysis. At a step 402, an unstructured search query is received from a user. At a step 404, a list of search results is generated and ranked in order of relevance to the search query. As discussed above, any relevancy-ranking heuristics or search techniques, which are well known in the art, may be used. At a step 406, a set of highly-relevant search results, which is a subset of the entire list of search results obtained, is analyzed to determine whether the set of highly-relevant search results share at least one common structure-attribute that is capable of being categorized. The set of highly-relevant search results may be any number of search results. For example, the top 20 search results obtained are analyzed. If the set of highly-relevant search results share at least one common-structure attribute, such as a price, rating, date, author, or source field, then the entire list of search results is analyzed to generate a search filter based on the common structure attribute at a step 412.

At a step 414, a structured search results interface is displayed suggesting the generated search filter to the user. For example, the user interface offers the user the option of refining the list of search results based on price. Continuing the above example, the user is offered the option of sorting the search results for "Nissan Altima" using a price range filter developed from the analysis of the structure of the search results. For example, the search filter allows the user to narrow the search results to display only those results with a price attribute having values falling within the range of $20,000 and $30,000. Or, the user can be offered a search filter allowing the user to narrow the search results by a year attribute to display only results having a year value of 2005, for example. If the method 400 determines that the set of highly-relevant search results does not have at least one common structure attribute then an unstructured search results interface is displayed, which was described above. The method 400 performs a "two-pass" analysis by first searching for structure inherent in the top search results and by then second searching for repetition of the structure throughout the entire list of search results. In an embodiment, the second step of the analysis may be limited to a specified number of search results to reduce the burden of analyzing the entire list of search results.

Figure 5:
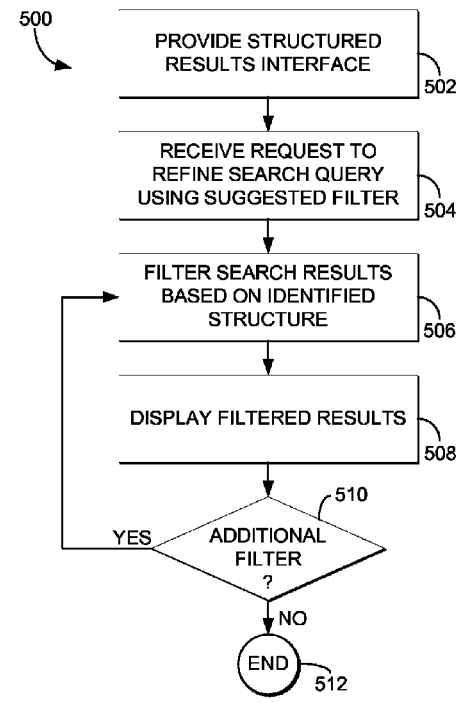
FIG. 5 is a flow diagram illustrating a method for displaying refined search results on a common display with search filter options generated from structure identified in search results, according to embodiments of the present invention.

FIG. 5 provides an exemplary method 500 for automatically displaying a list of refined search results in a structured-search-results interface. After it has been determined that it is appropriate to automatically display a structured-search-results interface, such as can be done using exemplary methods 300 or 400, the structured-search-results user interface can receive a request to refine the search results and display the refined search results. At a step 502, a structured-search-results interface is displayed. Exemplary user interfaces are described below. The structured-search-results interface includes one or more search-refinement options allowing a user to refine the search results by filtering or sorting them according to the suggested refinement options. At a step 504, a request is received to refine the search results using a suggested refinement option. For example, a user may wish to refine search results obtained for Nissan Altima by a common structure attribute for a year. In this case, the user may only wish to view results having a year of 2005. At a step 506, the list of search results is filtered based on the selected attribute. At a step 508 the refined search results are displayed in a structured-search-results interface. The refined search results may be displayed along with one or more columns categorizing attribute values associated with each search result. For example, the search results obtained for Nissan Altima having an associated year of 2005 may be displayed alone or may also be displayed with columns designating the year as 2005 for each result and also designating other attributes associated with each result such as price, color, or mileage.

At a step 510, an additional filter can be applied by the user. If the user requests to further refine the search results based on an additional common structure attribute, steps 506 and 508 are repeated to display the further refined search results. If the user does not specify an additional filter, at a step 512, the process ends. Now, exemplary user interfaces for displaying automatically a structured search results interface will be discussed.

Figure 6:
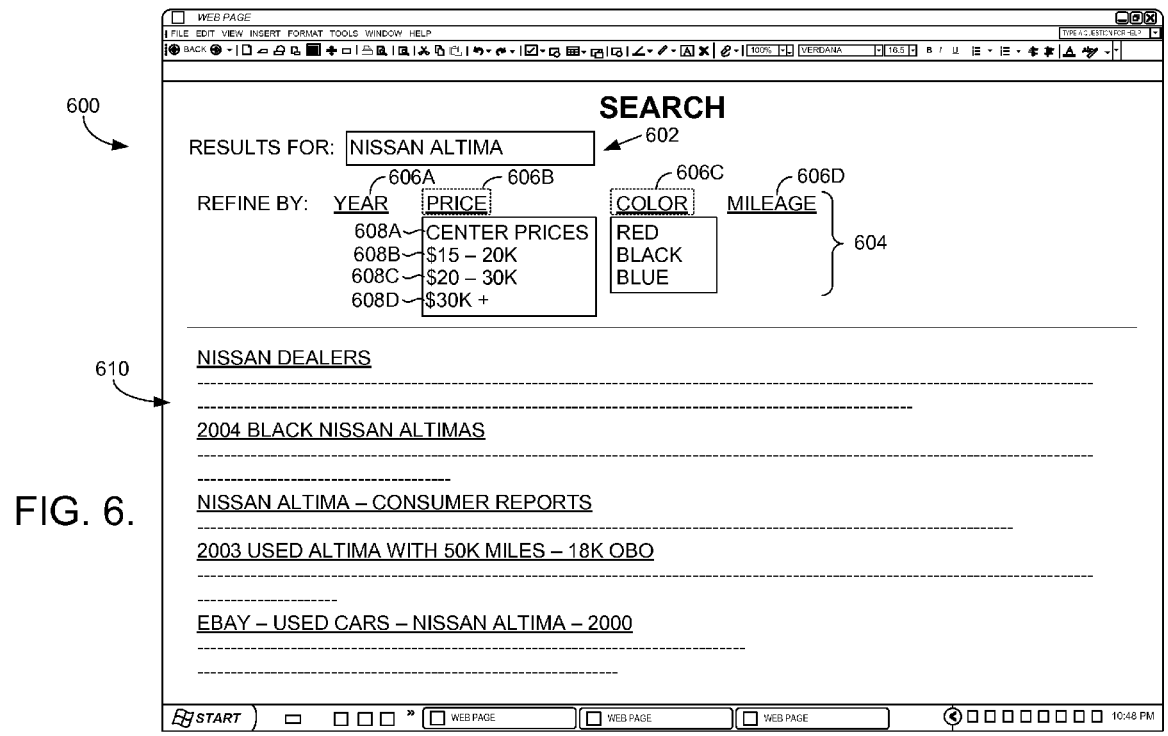
FIG. 6 is an exemplary interactive display of a user interface showing search-refinement options and search results on a common display, according to embodiments of the present invention.

FIG. 6 shows an exemplary interactive display of a structured-search-results user interface 600 displaying search-refinement options and web-search results on a common display. After the search engine component 220 determines that a structure threshold has been satisfied, a structured-search-results interface such as interface 600 is displayed. Interface 600 includes a search query input box 602. Interface 600 displays search-refinement options 606A-606D. In this case, the user interface 600 offers the user the option of refining the search results for the query "Nissan Altima" according to year, price, color, and mileage. These options were previously derived by the search engine component 220 having analyzed the structure present in the search results. The search-refinement options 604 correspond to shared-structure elements of year, price, color, and mileage identified in the search results. Interface 600 displays selection areas 606B and 606C. These selection boxes are operative to receive requests to refine the search results according to the selected shared-structure elements of price and color. Search filters 608A-608D are displayed upon selection of box 606B, for example. The search filters 608A-608D are based upon values associated with the identified shared-structure elements present in the search results. In this case, for example, results having price attribute values of between $15,000 and $20,000, between $20,000 and $30,000, and above $30,000 have been identified in the search results. The user is also presented with the option of entering a customized filter 608A to specify a price value. Search results 610 are displayed on a common display with search-refinement options 604 in interface 600. Upon selection of one or more search filters 608A-608D, the search results 610 are refined and the list of refined search results are displayed, such as is described above with reference to method 500. In this case, user interface 600 can receive a request to display only those "Nissan Altima" search results having the color attribute of black associated with them, for example. Interface 600 displays search-refinement options 604 automatically on a common display with the search results 610 even though the user entered an unstructured query of "Nissan Altima" in a generalized search engine.

Figure 7:
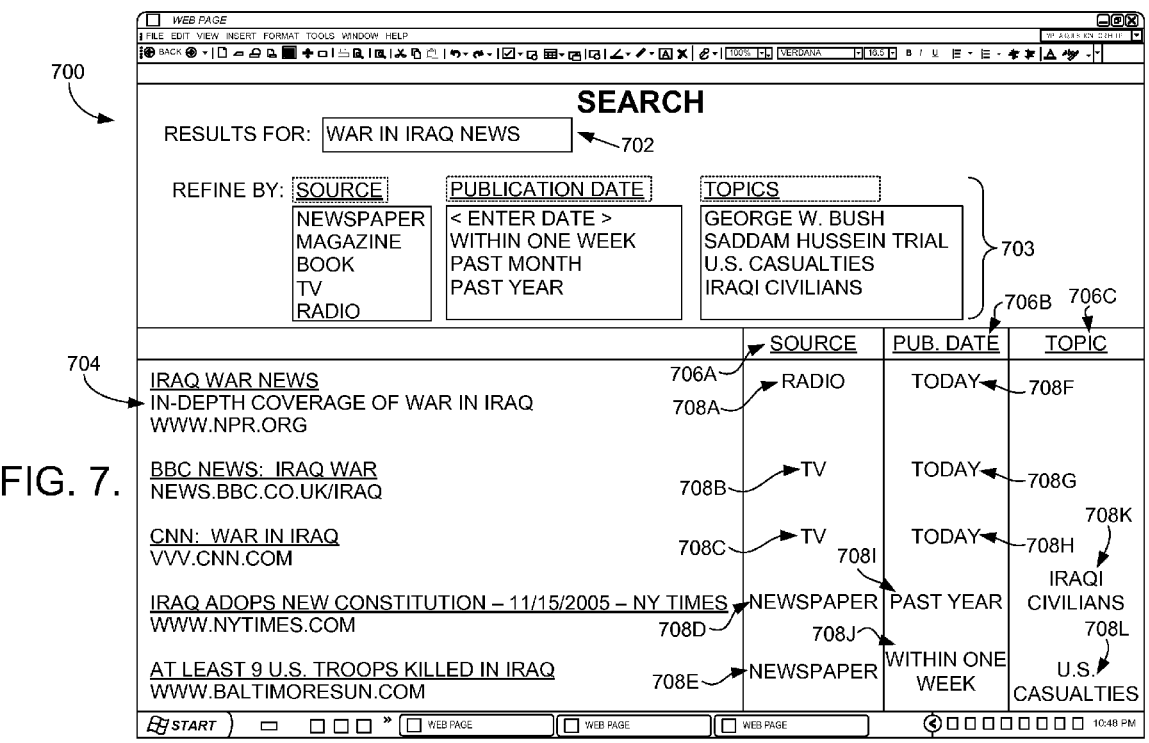
FIG. 7 is an exemplary interactive display of a user interface showing search-refinement options and search results with columns categorizing values associated with various common attributes describing the search results.

FIG. 7 displays an exemplary user interface 700 for automatically displaying search-refinement options 703 in response to an unstructured query being entered into input box 702, assuming that a structure threshold was satisfied, as described above. User interface 700 displays search results 704 on a common display with search-refinement options 703. Exemplary user interface 700 also displays columns 706A-706C categorizing values 708A-708L for the identified shared-structure elements of source, publication date, and topic for each of the search results 704. Columns 706A-706C allow the user to sort the search results 704 using the structure that was identified in the search results. For example, the user may choose to sort search results for the query "war in Iraq news" according to the shared-structure element "source." In this case, the user may only desire to view search results having a newspaper as a source. Also, the user may wish to sort the search results based on an identified shared-structure element of "publication date." In this case, the user may choose to sort the search results to only display those results having a publication date within the past week.

Although the subject matter has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. And, although the subject matter has been described in language specific to methodological acts, the subject matter defined in the appended claims is not necessarily limited to the specific acts described above. Rather, the specific acts described above are disclosed as example forms of implementing the claims.

Although particular exemplary user interfaces have been described, it will be evident to one of ordinary skill in the art that other user interfaces can be used without departing from the scope of the invention. And, although particular examples of structured data have been provided, the present invention is not limited to particular types of structured data.

Now, an exemplary operating environment for embodiments of the present invention will be discussed.

Figure 1:
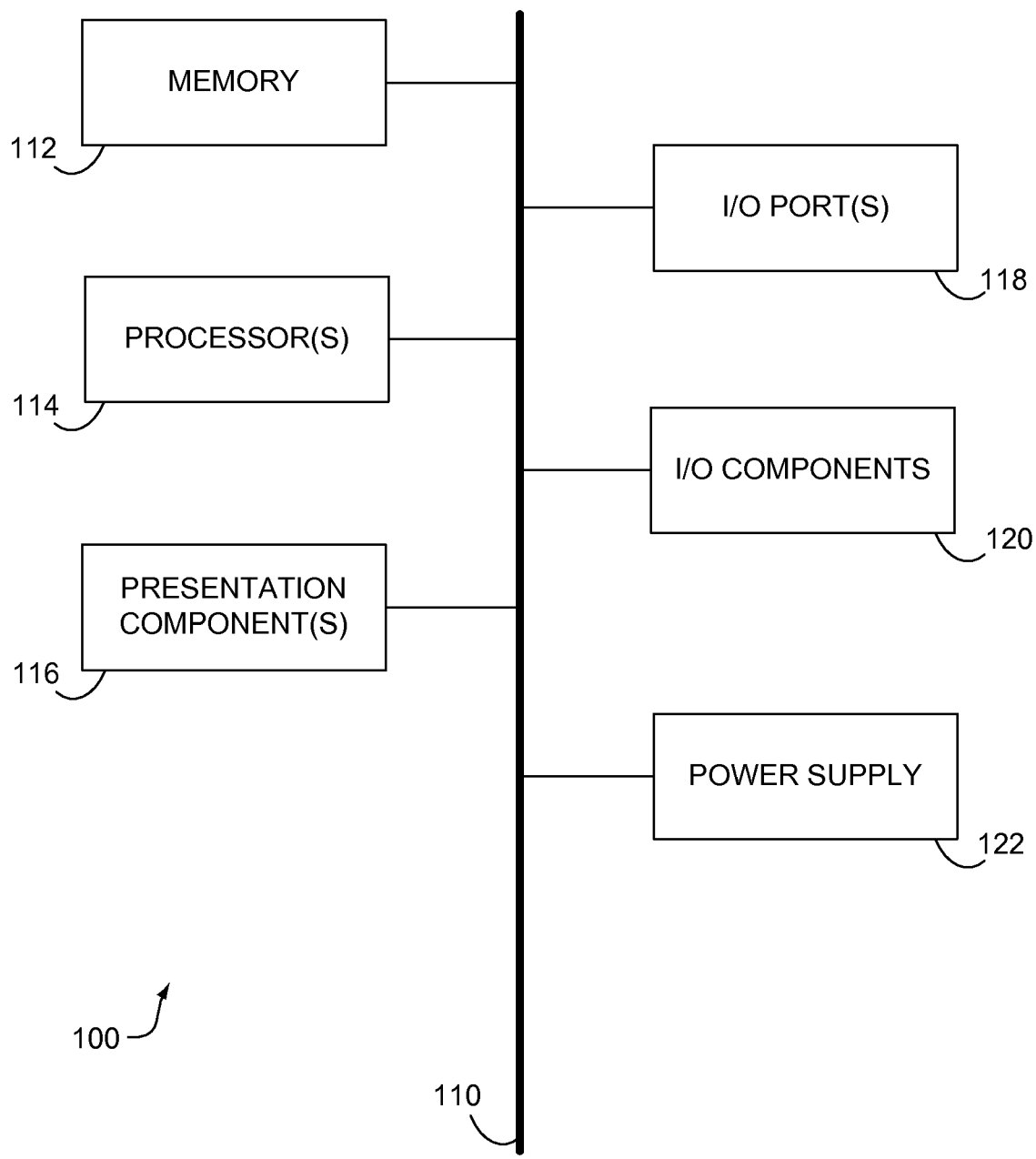
FIG. 1 is a block diagram of an exemplary operating environment.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network. In a distributed-computing environment, program modules may be located in both local and remote computer-storage media including memory-storage devices. The computer-useable instructions form an interface to allow a computer to react according to a source of input. The instructions cooperate with other code segments to initiate a variety of tasks in response to data received in conjunction with the source of the received data.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other receptacle or carrying device on which information may be stored, and which can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. Though a particular exemplary operating environment has been discussed, many other suitable operating environments can be used.

The invention claimed is:

1. A computer-implemented method of automatically providing search query refinement options using a computing device having processor, memory, and data storage subsystems, the computer-implemented method comprising:
   receiving an unstructured web-search query request from a user via a user input component;
   initiating an unstructured web-search query according to the unstructured web-search query request;
   obtaining a first set of web-search results in response to said unstructured web-search query, wherein the first set of web-search results are ranked in order of relevance;
   determining whether sufficient common structure attributes are present in the first set of web search results to satisfy a structure threshold, wherein the structure threshold is satisfied if a sufficient percentage or absolute count of the first set of web search results have one or more common structure attributes, and the common structure attributes comprise similar name-value pairs having shared common name fields in meta-tags or in XML-code contained in the first set of search results;
   analyzing a subset of top-ranked web-search results from the first set to identify a common structure attribute present in the subset;
   analyzing the first set of web-search results according to the identified common structure attribute in the subset analysis;
   automatically generating a set of search refinement options according to the analysis of the first set of web-search results according to the identified common structure attribute;
   communicating the set of search refinement options for display to a user output device;
   receiving a selection of one of the search refinement options; and
   communicating a second set of web-search results resulting from the selected search refinement option to the user output device.

2. The computer-implemented method of claim 1, further comprising:
   filtering the subset of top-ranked web-search results according to the common structure attribute identified.

3. The computer-implemented method of claim 2, further comprising:
   automatically communicating one or more columns listing, for each search result, a value associated with each selected common structure attribute.

4. The computer-implemented method of claim 1, wherein a plurality of common structure attributes comprise overlapping schema attributes.

5. One or more computer storage media having computer-executable instructions embodied thereon that, when executed by a computing device, perform a method of providing search query refinement options, the method comprising:
   receiving an unstructured web-search query request from a user via a user input component;
   initiating an unstructured web-search query according to the unstructured web-search query request;
   obtaining original web-search results in response to said unstructured web-search query, wherein the original web-search results are ranked in order of relevance;
   determining whether sufficient common structure attributes are present in the original web search results to satisfy a structure threshold, wherein the structure threshold is satisfied if a sufficient percentage or absolute count of the original web search results have one or more common structure attributes, and wherein the common structure attributes comprise similar name-value pairs having shared common name fields in meta-tags or in XML-code contained in the original web search results;
   obtaining a highly relevant subset of results from the ranked original web-search results;
   analyzing said highly relevant subset of results to extract one or more common attributes present in the highly relevant subset of results;
   analyzing the original web-search results to generate one or more search filters based upon the one or more common attributes present in the highly relevant subset of results;
   communicating a user option for selecting one of the generated search filters to a user structured search results interface;
   refining the original web-search results based upon the selected generated search filter; and returning the original web-search results and the refined original web-search results based upon the selected generated search filter, to the user structured search results interface.

6. The method of claim 5, wherein said original web search results comprise internet-search results and said web search query comprises an internet-search query.

7. The method of claim 5, further comprising determining whether said original web search results vary sufficiently to satisfy a variance threshold with respect to a particular overlapping schema attribute from a plurality of overlapping schema attributes.

8. The method of claim 7, wherein one or more of said plurality of overlapping schema attributes are common to a shared formal schema.

9. The method of claim 5, further comprising receiving a request to refine said web search results by applying a filter based on at least one selected overlapping schema attribute.

10. In a computer system having a processor, memory and data storage subsystems, a computer-implemented system for automatically providing a structured-search-results user interface in response to unstructured queries, the computer-implemented system comprising:
- a user input component, to receive an unstructured search query request from a user;
- a data store comprising information elements, wherein the information elements comprise structured data, semi-structured data, and unstructured data;
- a search engine component to obtain original search results from the data store in response to the unstructured search query request wherein the original search results are ranked in order of relevance, and further the search engine component to obtain a highly relevant subset of results from the ranked original search results;
- an analytical component to determine whether sufficient common structure attributes are present in the original search results to satisfy a structure threshold, wherein the structure threshold is satisfied if a sufficient percentage or absolute count of the original search results have one or more common structure attributes which comprise similar name-value pairs having shared common name fields in meta-tags or in XML-code contained in the original search results, and the analytical component to further determine one or more categories present in the highly relevant subset of results and to generate a search filter for the original search results based upon a variance threshold of the one or more categories present in the highly relevant subset of results; and
- an interface component to communicate the original search results, a user option for selecting the generated search filter from an analysis of the highly relevant subset of results, and refined original search results based upon the selected generated search filter via a request from the user input component.

11. The computer-implemented system of claim 10, wherein the original search results comprise internet-search results and the search query comprises an internet-search query.

12. The computer-implemented system of claim 11, wherein the search engine component further determines whether the original search results vary sufficiently to satisfy a variance threshold with respect to a particular overlapping schema attribute from a plurality of overlapping schema attributes.

13. The computer-implemented system of claim 12, wherein the plurality of overlapping schema attributes are common to a shared formal schema, and further wherein the communicated generated search filter comprises filter and sort options specified by the shared formal schema.

14. The computer-implemented system of claim 10, wherein the interface component receives a request to refine the original search results by applying a filter based on at least one selected overlapping schema attribute.

15. The computer-implemented system of claim 14, wherein the interface component automatically communicates one or more columns listing, for each original search result, a value associated with each selected category.

* * * * *

UNITED STATES PATENT AND TRADEMARK OFFICE
CERTIFICATE OF CORRECTION

PATENT NO. : 7,792,821 B2  
APPLICATION NO. : 11/427693  
DATED : September 7, 2010  
INVENTOR(S) : Darren A. Shakib et al.

Page 1 of 1

It is certified that error appears in the above-identified patent and that said Letters Patent is hereby corrected as shown below:

Column 11, line 3, in Claim 5, delete "filter," and insert -- filter --, therefor.

Signed and Sealed this  
Twenty-fifth Day of January, 2011

David J. Kappos  
*Director of the United States Patent and Trademark Office*